W. M. EDDELMAN.
FRUIT-DRIER.

No. 191,324. Patented May 29, 1877.

WITNESSES:
Gustav Dieterich
J. H. Scarborough

INVENTOR:
W. M. Eddelman
BY
ATTORNEYS.

N. PETERS, PHOTO-LITHOGRAPHER, WASHINGTON, D. C.

UNITED STATES PATENT OFFICE.

WILLIAM M. EDDELMAN, OF WAHOO, NEBRASKA.

IMPROVEMENT IN FRUIT-DRIERS.

Specification forming part of Letters Patent No. 191,324, dated May 29, 1877; application filed March 19, 1877.

*To all whom it may concern:*

Figure 1:
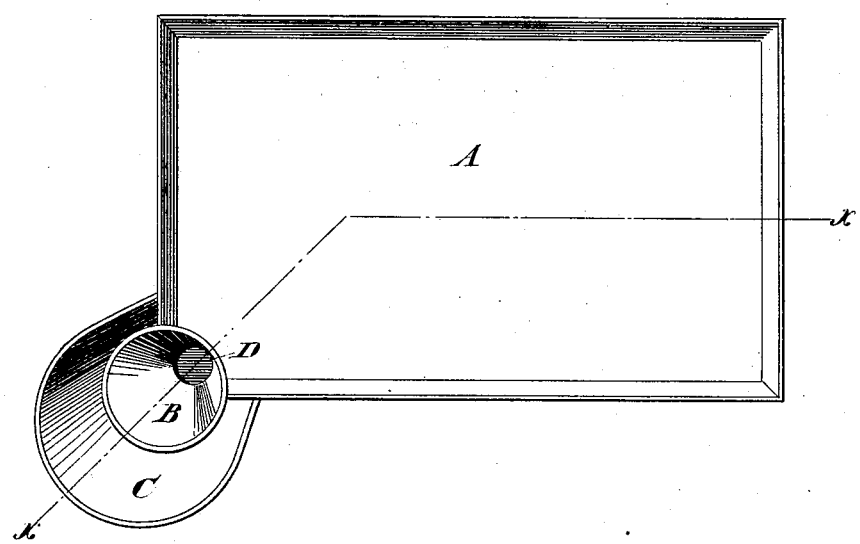
Figure 2:
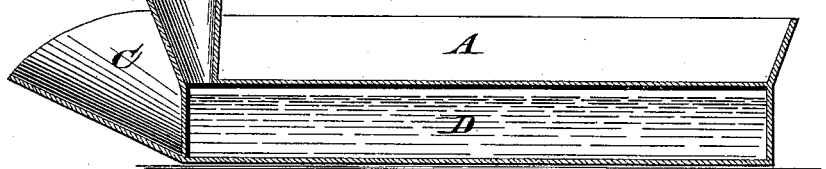

Be it known that I, WILLIAM M. EDDELMAN, of Wahoo, in the county of Saunders and State of Nebraska, have invented a new and Improved Fruit-Drier, of which the following is a specification:

In the accompanying drawing, Figure 1 represents a top view, and Fig. 2 a vertical longitudinal section on line $x\, x$, Fig. 1, of my improved fruit-drier.

Similar letters of reference indicate corresponding parts.

The invention has reference to an improved fruit-drier of simple and cheap construction, that may be used on any stove or furnace without danger of smoking, burning, or charring the fruit; and the invention consists of a double pan having a bottom receptacle filled with water by a funnel-shaped spout, that is surrounded by a dishing plate to catch any water forced out by the steam.

In the drawing, A represents a fruit-drying pan of flat shape, which has a double bottom that forms a receptacle, D, for water and steam below the bottom of the drying-pan. The water is filled into the receptacle D by a funnel-shaped corner-spout, B, with outward inclination, through which the steam formed in the receptacle may escape.

The heat produced by the generation of steam in the receptacle dries the fruit in a superior manner, without exposing the same in the least to the danger of being burned or charred, or of obtaining a smoky taste, as in the common mode of drying fruit.

The spout B is surrounded below by a dishing guard-plate, C, that collects all the water that escapes by the action of the steam, so as to prevent the same from dropping on the fruit or on the stove. The fruit-drying pan may be used on every stove or furnace, and is adapted to dry the fruit, without any loss, in a clean, rapid, and superior manner.

Having thus described my invention, I claim as new and desire to secure by Letters Patent—

A fruit-drier consisting of fruit-pan A, funnel B, guard C, and water-chamber D, constructed and arranged as shown and described, so that it may be used upon any ordinary stove, as specified.

WILLIAM M. EDDELMAN.

Witnesses:
    F. M. STRATTON,
    JOSEPH N. DAVIS.